US008419374B2

(12) United States Patent
Huth et al.

(10) Patent No.: US 8,419,374 B2
(45) Date of Patent: Apr. 16, 2013

(54) GAS TURBINE ENGINE COMPOSITE BLADE

(75) Inventors: Brian P. Huth, Westfield, MA (US);
Phillip Alexander, Colchester, CT (US);
Carl Brian Klinetob, East Haddam, CT (US); Michael Parkin, South Glastonbury, CT (US); Rajiv A. Naik, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 754 days.

(21) Appl. No.: 12/541,195

(22) Filed: Aug. 14, 2009

(65) Prior Publication Data

US 2011/0038732 A1    Feb. 17, 2011

(51) Int. Cl.
*F01D 5/28* (2006.01)

(52) U.S. Cl.
USPC .......................................... 416/224; 416/230

(58) Field of Classification Search .............. 416/224, 416/230, 241 R
See application file for complete search history.

(56) References Cited

U.S. PATENT DOCUMENTS

| 4,581,053 | A | 4/1986 | Prewo et al. |
| 4,815,940 | A | 3/1989 | LeShane et al. |
| 4,916,997 | A | 4/1990 | Spain |
| 5,001,961 | A | 3/1991 | Spain |
| 5,123,814 | A * | 6/1992 | Burdick et al. ............... 416/224 |
| 5,240,377 | A | 8/1993 | Farr |
| 5,279,892 | A | 1/1994 | Baldwin et al. |
| 5,308,228 | A * | 5/1994 | Benoit et al. .................. 416/230 |
| 5,392,683 | A | 2/1995 | Farley |
| 5,449,273 | A | 9/1995 | Hertel et al. |
| 5,912,195 | A | 6/1999 | Walla et al. |
| 6,056,838 | A * | 5/2000 | Besse et al. ..................... 156/75 |
| 6,102,662 | A * | 8/2000 | Bost et al. ..................... 416/224 |
| 6,431,837 | B1 | 8/2002 | Velicki |
| 6,843,928 | B2 * | 1/2005 | Cline et al. ...................... 216/96 |
| 2006/0216154 | A1 * | 9/2006 | McMillan ................. 416/241 R |

* cited by examiner

*Primary Examiner* — Christopher Verdier
(74) *Attorney, Agent, or Firm* — Carlson, Gaskey & Olds P.C.

(57) ABSTRACT

The disclosed composite airfoil includes a three-dimensional composite core extending longitudinally and having a chord-wise direction. The core has a core in-plane thickness extending between opposing sides in a through-plane direction generally perpendicular to the chord-wise and longitudinal directions. A composite skin covers the opposing sides and has an exterior surface providing an airfoil contour. The skin includes a total skin in-plane thickness corresponding to a sum of thicknesses through the skin in the through-plane direction from each of the opposing sides to their adjoining exterior surface. A sum of the core in-plane and total skin in-plane thicknesses at a central portion of the composite airfoil is a total in-plane thickness. The total skin in-plane thickness at the central portion is less than 50% of the total in-plane thickness.

13 Claims, 1 Drawing Sheet

GAS TURBINE ENGINE COMPOSITE BLADE

BACKGROUND

This disclosure relates to composite blades. In one example, this disclosure relates to a composite fan blade for a gas turbine engine.

One type of typical gas turbine engine for commercial aircraft applications includes a fan section at an inlet of the engine. It is desirable to design lighter engines, including lighter fan sections, to improve fuel economy. To this end, the use of composite fan blades in the fan section has become more prevalent.

The fan section is designed to withstand ingestion of foreign objects to some degree, such as bird strikes. In particular, fan blades must withstand two failure modes experienced during ingestion of foreign objects: interlaminar shear failure and in-plane failure under severe loads induced by the foreign object impact. Fan blades constructed from composite cores wrapped in composite layers have been suggested in the art; however, these composite fan blades do not exhibit desired interlaminar shear strength.

SUMMARY

A method of manufacturing a composite airfoil is disclosed that includes providing a fibrous preform core. The fibrous preform core is covered in at least one dry woven layer to provide a skin. The covered fibrous preform core is inserted into a mold cavity. The covered fibrous preform core is impregnated with resin in the mold to produce the composite airfoil. A total skin thickness is less than a core thickness at a central portion of the composite airfoil.

In one example, the composite airfoil, such as a fan blade, includes a three-dimensional composite core extending longitudinally and having a chord-wise direction. The core has a core in-plane thickness extending between opposing sides in a through-plane direction generally perpendicular to the chord-wise and longitudinal directions. A composite skin covers the opposing sides and has an exterior surface providing an airfoil contour. The composite core and composite skin also provides at least a portion of a root of the fan blade in one example. The skin includes a total skin in-plane thickness corresponding to a sum of thicknesses through the skin in the through-plane direction from each of the opposing sides to their adjoining exterior surface. A sum of the core in-plane and skin in-plane thicknesses at a central portion of the composite airfoil is a total in-plane thickness. The total skin in-plane thickness at the central portion is less than 50% of the total in-plane thickness.

These and other features of the disclosure can be best understood from the following specification and drawings, the following of which is a brief description.

DETAILED DESCRIPTION

Figure 1A:
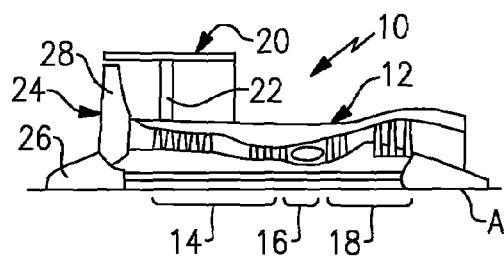
FIG. 1A is a schematic view of an example gas turbine engine.

A gas turbine engine 10 is schematically shown in FIG. 1A. The engine 10 includes a core 12 having a compressor section 14, a combustion section 16 and a turbine section 18. A fan case 20 is supported on the core 12 by flow exit guide vanes 22. The fan case 20 houses a fan section 24 in front of the core 12 that includes multiple circumferentially arranged fan blades 28 and a nose cone 26. The compressor, turbine and fan sections 14, 18, 24 are rotatable about an axis A.

Figure 1B:
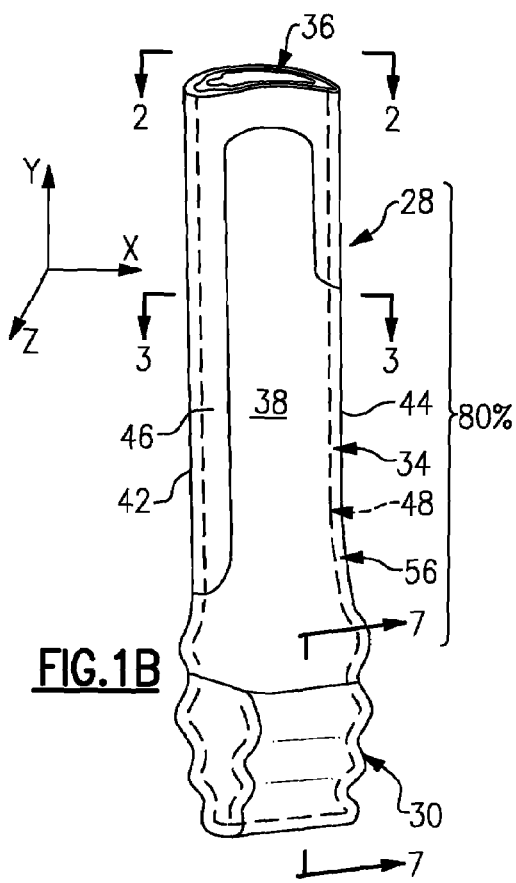
FIG. 1B is a perspective view of an example fan blade.

An example fan blade 28 is schematically shown in FIG. 1B. The fan blade 28 includes an airfoil 34 longitudinally extending from a root 30 in a radial direction Y to a tip 36. An in-plane thickness of the airfoil 34 corresponds to a through-plane direction Z that is generally perpendicular to a chord-wise direction X and the longitudinal direction Y. The airfoil 34 includes opposing sides 38, 40 extending in the chord-wise direction X that respectively provide concave and convex surfaces. Leading and trailing edges 42, 44 adjoin the opposing sides 38, 40. In the illustrated example, the leading edge 42 includes a reinforcement 46 to improve structural rigidity and/or reduce wear. The reinforcement 46 is a metallic member in one example. The reinforcement 46 may wrap around other portions of the airfoil 34, as illustrated in FIG. 1B, for example.

Figure 7:
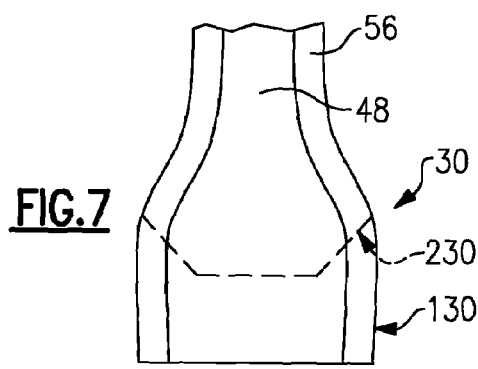
FIG. 7 is an example fan blade schematically indicating machining to provide a final root shape.

The fan blade 28 is constructed from a composite core 48 covered by a composite skin 56, both of which are impregnated by resin during manufacturing. The composite core 48 is illustrated by the dashed lines in FIG. 1B. For the illustrated example fan blade, the root 30 includes a portion 130 that is machined during the fan blade manufacturing process to provide a machined surface 230 having a final root shape, as shown in FIG. 7.

Figure 4:
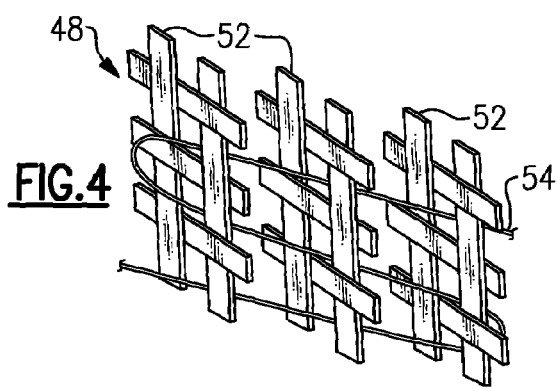
FIG. 4 is a schematic perspective view of a composite core preform.
Figure 5:
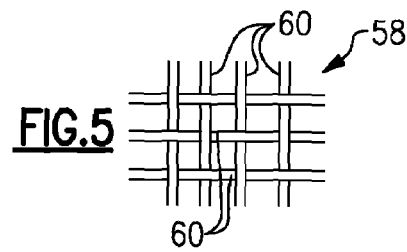
FIG. 5 is a schematic plane view of a composite woven fiber layer used to provide a skin over the core.

Referring to FIG. 4, the composite core 48 is depicted in a highly schematic fashion. In one example, the composite core 48 is provided as a preform (dry, unlike a prepreg core), using multiple fibers 52 interwoven to one another by other fibers 54 to provide three-dimensional weaves. In one example, the fibrous composite core 48 is provided using an aeronautical grade fiber, such as IM7 carbon fiber. The skin 56 is provided using multiple layers of two-dimensional plies 58 provided by woven fibers 60 of a similar grade, for example, as schematically illustrated in FIG. 5. The plies 58 are generally of a constant thickness, as opposed to the composite core 48, which varies in shape generally correspondingly to the fan blade shape. A suitable aeronautical grade resin is used to bind the skin 56 to the composite core 48.

Figure 6:
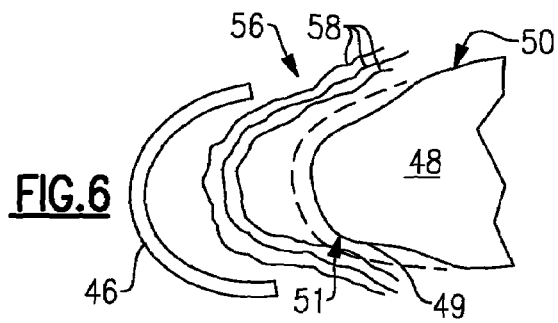
FIG. 6 is a partial exploded view of a leading edge of the fan blade shown in FIG. 1B.

Referring to FIG. 6, the composite core 48 is covered with multiple layers or plies 58 to provide the skin 56. The number of plies 58 used may vary based upon the application. Good adhesion between the plies 58 and composite core 48 subsequent to a foreign object impact is required to provide desired interlaminar shear strength. As seen in FIG. 1B, the composite core 48 provides a portion of the root 30 and airfoil 34. The skin 56 wraps around the root 30, opposing sides 38, 40, and leading and trailing edges 42, 44. In the example, the skin 56 does not wrap over the tip 36, which is machined during the manufacturing process. A portion of the core 48 and the skin 56 may be machined from the root 30, as previously described. A nose 51 of the composite core 48 near the leading edge 42 includes a recess 49 (indicated by dashed lines) sized to accommodate the reinforcement 46 during manufacturing.

Figure 2:
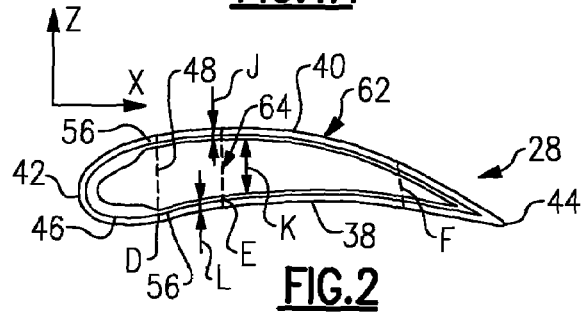
FIG. 2 is an end view of the fan blade taken in direction 2-2 of FIG. 1B.
Figure 3:
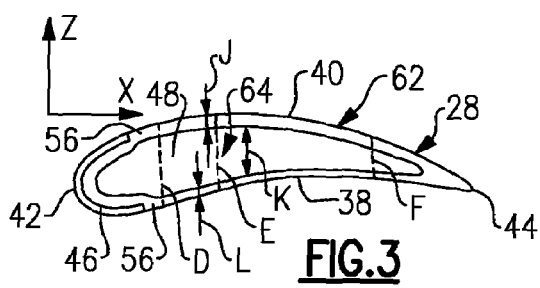
FIG. 3 is a cross-sectional view of the fan blade shown in FIG. 1B taken along line 3-3.

The composite core 48 provides a contour 50 that generally corresponds to an airfoil contour provided by the exterior surface 62 of the root 30 and airfoil 34 (see, e.g., FIGS. 2 and 3).

The composite fan blade 28 or airfoil is manufactured by providing the fibrous composite core 48 as a preform. The preform composite core 48 is covered in at least one dry woven layer or ply 58 to provide the skin 56. In the example, the plies 58 are not provided as a prepreg with impregnated resin. In one example, multiple plies 58 are wrapped about the composite core 48 in various orientations to provide desired strength characteristics. The covered fibrous preform core is inserted into a mold cavity dry and impregnated with resin to produce the fan blade 28. The reinforcement 46 is arranged over the recess 51 within the cavity during the molding process. In one example, the recess 51 for the reinforcement 46 is molded in and the reinforcement 46 is subsequently bonded to the cured blade. In another example, the reinforcement 46 is placed over the dry preform and the resin is used to bond the reinforcement to the composite.

Referring to FIGS. 2 and 3, the thickness of the skin 56 over the composite core 48 is generally uniform along the length of the fan blade 28 and generally equal thickness on each of the opposing sides 38, 40. Various locations D, E, F along a central portion 64 of the airfoil 34 are illustrated in FIGS. 2 and 3. Referring to location E, for example, the composite core 48 includes a core in-plane thickness K. The skin 56 includes a total skin in-plane thickness that corresponds to the sum of the skin in-plane thicknesses J and L. The skin in-plane thicknesses J and L extend from the contour 50 of the composite core 48 provided by to an adjoining exterior surface 62 of the skin 56, which provides the airfoil contour.

To provide desired in-plane strength and interlaminar shear strength (between plies 58 and composite core 48) in the event of a foreign object impact, the skin in-plane thickness is less than 50% of the total in-plane thickness of the airfoil at the central portion 64. By comparison, prior art skin in-plane thickness are relatively large compared to core in-plane thickness. The approach taken in the disclosed examples actually reduces skin in-plane thickness as compared to the prior art to increase interlaminar shear strength. In one example, the skin in-plane thickness is between 25-35% total in-plane thickness. In another example, the total skin in-plane thickness is approximately 30% of the total in-plane thickness of the airfoil, or about a skin in-plane thickness of 15% on each of the opposing sides 38, 40. For example, a 30% total in-plane thickness corresponds to 0.060 inch (1.524 mm) on each side along 80% the radial distance outward from the root 30 and 10% total in-plane thickness over the root 30. In another example in which the total in-plane thickness is 35%, the thickness on each side is 0.075 inch (1.905 mm) along 80% the radial distance outward from the root 30 and 0.219 inch (5.563 mm) at the root 30. In the example, the in-plane thicknesses of the skin 56 on each side of the composite core 48 are roughly equal.

Although example embodiments have been disclosed, a worker of ordinary skill in this art would recognize that certain modifications would come within the scope of the claims. For example, the disclosed composite blade can also be used as propellers. For that reason, the following claims should be studied to determine their true scope and content.

What is claimed is:

1. A composite airfoil comprising:
   a three-dimensional composite core extending longitudinally and having a chord-wise direction, having a core in-plane thickness extending between opposing sides in a through-plane direction generally perpendicular to the chord-wise and longitudinal directions;
   a composite skin covering the opposing sides and having an exterior surface providing an airfoil contour, the skin having a total skin in-plane thickness corresponding to a sum of thicknesses through the skin in the through-plane direction from each of the opposing sides to their adjoining exterior surface, a sum of the core in-plane and skin in-plane thicknesses at a central portion of the composite airfoil being a total in-plane thickness, with the total skin in-plane thickness at the central portion being between 25% to 35% of the total in-plane thickness; and
   wherein the total skin in-plane thickness is 10% of the total in-plane thickness over a root from which the airfoil longitudinally extends.

2. The composite airfoil according to claim 1, wherein the composite skin comprises multiple woven fiber plies wrapped about the composite core, which is constructed from a fibrous preform, the composite core and composite skin bound together by a resin.

3. The composite airfoil according to claim 1, wherein the total skin in-plane thickness is approximately 30% of the total in-plane thickness.

4. The composite airfoil according to claim 3, wherein the skin in-plane thicknesses are each approximately 15%.

5. The composite airfoil according to claim 1, wherein the skin in-plane thicknesses are approximately equal to one another.

6. A composite airfoil comprising:
   a three-dimensional composite core extending longitudinally and having a chord-wise direction, having a core in-plane thickness extending between opposing sides in a through-plane direction generally perpendicular to the chord-wise and longitudinal directions;
   a composite skin covering the opposing sides and having an exterior surface providing an airfoil contour, the skin having a total skin in-plane thickness corresponding to a sum of thicknesses through the skin in the through-plane direction from each of the opposing sides to their adjoining exterior surface, a sum of the core in-plane and skin in-plane thicknesses at a central portion of the composite airfoil being a total in-plane thickness, with the total skin in-plane thickness at the central portion being less than 50% of the total in-plane thickness; and
   wherein the composite core includes a recess near a leading edge of the airfoil, and a reinforcement secured over the recess with the composite skin arranged between and directly interconnecting the reinforcement and composite core; and
   wherein the total skin in-plane thickness is 10% of the total in-plane thickness over a root from which the airfoil longitudinally extends.

7. The composite airfoil according to claim 6, wherein the reinforcement extends longitudinally from a tip toward the root and in the chord-wise direction over the tip and longitudinally along a trailing edge portion of the airfoil.

8. The composite airfoil according to claim 7, wherein the total skin in-plane thickness is substantially constant along 80% of the radial distance outward from the root.

9. A composite airfoil comprising:
   a three-dimensional composite core extending longitudinally and having a chord-wise direction, having a core in-plane thickness extending between opposing sides in a through-plane direction generally perpendicular to the chord-wise and longitudinal directions;
   a composite skin covering the opposing sides and having an exterior surface providing an airfoil contour, the skin having a total skin in-plane thickness corresponding to a sum of thicknesses through the skin in the through-plane direction from each of the opposing sides to their adjoining exterior surface, a sum of the core in-plane and skin in-plane thicknesses at a central portion of the composite airfoil being a total in-plane thickness, with the total skin in-plane thickness at the central portion being less than 50% of the total in-plane thickness; and wherein the composite core and composite skin provide at least a portion of the airfoil and a root from which the airfoil longitudinally extends; and wherein the total skin in-plane thickness is substantially constant along 80% of the radial distance outward from the root.

10. A method of manufacturing a composite airfoil comprising:

providing a fibrous preform core;

covering the fibrous preform core in at least one dry woven layer to provide a skin;

inserting the covered fibrous preform core in a mold cavity; and impregnating the covered fibrous preform core with resin to produce the composite airfoil wherein a total skin thickness is less than a core thickness at a central portion of the composite airfoil, wherein the total skin thickness is between 25% to 35% of the total thickness of the airfoil at the central portion; and wherein a total skin in-plane thickness is 10% of a total in-plane thickness over a root from which the airfoil longitudinally extends.

11. The method according to claim 10, wherein the total skin thickness is approximately 30% of the total thickness of the airfoil at the central portion.

12. The method according to claim 11, wherein the skin thickness on each of opposing sides of the airfoil at the central portion is approximately 15%.

13. The method according to claim 10, wherein the skin thickness on each of opposing sides of the airfoil at the central portion are approximately equal to one another.

* * * * *